United States Patent
Gorgas et al.

(10) Patent No.: US 7,044,099 B2
(45) Date of Patent: May 16, 2006

(54) CYLINDER HEAD GASKET WITH INTEGRAL FILTER ELEMENT

(75) Inventors: Steven J Gorgas, Ortonville, MI (US); Michael C Lefebvre, West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/741,925

(22) Filed: Dec. 19, 2003

(65) Prior Publication Data

US 2005/0132998 A1   Jun. 23, 2005

(51) Int. Cl.
*F01M 1/00* (2006.01)
*F02F 11/00* (2006.01)

(52) U.S. Cl. .................. 123/196 R; 277/592
(58) Field of Classification Search ............ 123/196 R, 123/196 A, 90.33, 90.34; 277/590–601
See application file for complete search history.

(56) References Cited

U.S. PATENT DOCUMENTS 6,295,964 B1 * 10/2001 DiMaria et al. ........ 123/196 R
6,484,680 B1 * 11/2002 Lunsford ................. 123/90.33

FOREIGN PATENT DOCUMENTS

CA     2425731 A1 * 10/2003
JP     06336911 A  * 12/1994
JP     10159650 A  *  6/1998

* cited by examiner

*Primary Examiner*—Henry C. Yuen
*Assistant Examiner*—Hyder Ali
(74) *Attorney, Agent, or Firm*—Thomas A. Jurecko

(57) ABSTRACT

A cylinder head gasket for an engine is provided. The gasket includes an opening positioned in a gasket substrate and arranged to align with an engine oiling circuit passage to allow oil to flow from a cylinder block through the gasket to a cylinder head. The gasket further includes a filter element attached to the gasket relative to the opening and arranged to provide a barrier to debris in the oiling circuit.

4 Claims, 3 Drawing Sheets

CYLINDER HEAD GASKET WITH INTEGRAL FILTER ELEMENT

FIELD OF THE INVENTION

The present invention relates generally to a gasket for an engine and, more particularly, to a cylinder head gasket with a filtering element for an internal combustion engine.

BACKGROUND OF THE INVENTION

With the onset of more stringent fuel economy and emission standards, internal combustion engines used in today's vehicles are being designed with much tighter operating clearances. These tighter clearances are typically associated with main bearings, connected rod bearings, and valve train components such as hydraulic lifters, lash adjusters, cam phasers, hydraulic tensioners, hydraulic cylinder deactivation solenoids and similarly oiled components. Many of the aforementioned components, such as the hydraulic valve train componentry, run with 5–10 micron clearances during normal engine operation.

The use of these tighter clearances typically results in an engine being much more sensitive to manufacturing and wear debris. Even with an oil filter, it is not uncommon for cylinder head components such as lifters, cam phasers and cylinder deactivation solenoids to become lodged with debris.

The valve train componentry in the cylinder head is typically fed by an internal oiling circuit comprising mating passages in the cylinder block and cylinder heads. A gasket is used to seal the interface between the cylinder heads and cylinder block. The gasket includes openings designed for allowing oil to pass through the gasket as it travels from the cylinder block to the cylinder heads. These openings often include orifices to meter the oil as it passes through the gasket in order to balance the oil pressure between the cylinder block and the cylinder heads. The gasket openings and corresponding orifices serve as the only oil path to the cylinder heads allowing an oil supply that may also include debris to reach, among other things, the cylinder head valve train componentry.

While such conventional gasket and oiling systems work for their intended purpose, today's engines with tighter tolerances in the cylinder head valve train componentry require more stringent control of debris that may be carried by oil in the oiling circuit.

SUMMARY OF THE INVENTION

Accordingly, an improved cylinder head gasket arrangement for an engine is provided. The cylinder head gasket includes an opening positioned in the gasket that is in alignment with an engine oiling circuit passage to allow oil to flow from a cylinder block through the gasket to a cylinder head. The gasket further includes a filter element attached to the gasket relative to the gasket opening and arranged to provide a barrier to debris in the oiling circuit.

In accordance with another aspect of the present invention, the cylinder head gasket is provided having an opening with an oil metering orifice for balancing pressure between the cylinder block and the cylinder head.

In accordance with yet another aspect of the present invention, the cylinder head gasket provided includes a multi layer steel cylinder head gasket.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
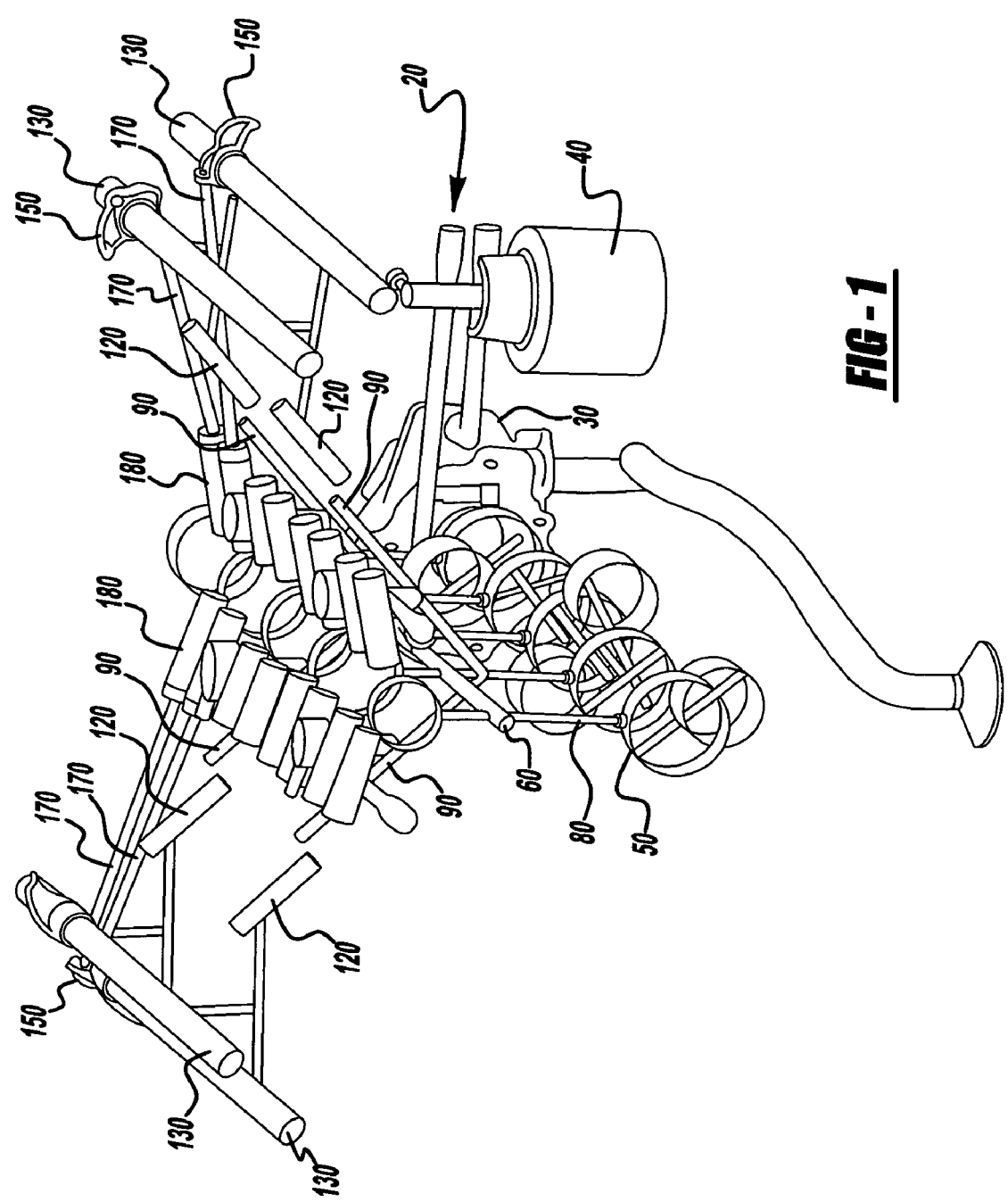
FIG. 1 illustrates an engine oiling circuit shown without corresponding engine structure in accordance with the present invention.
Figure 2:
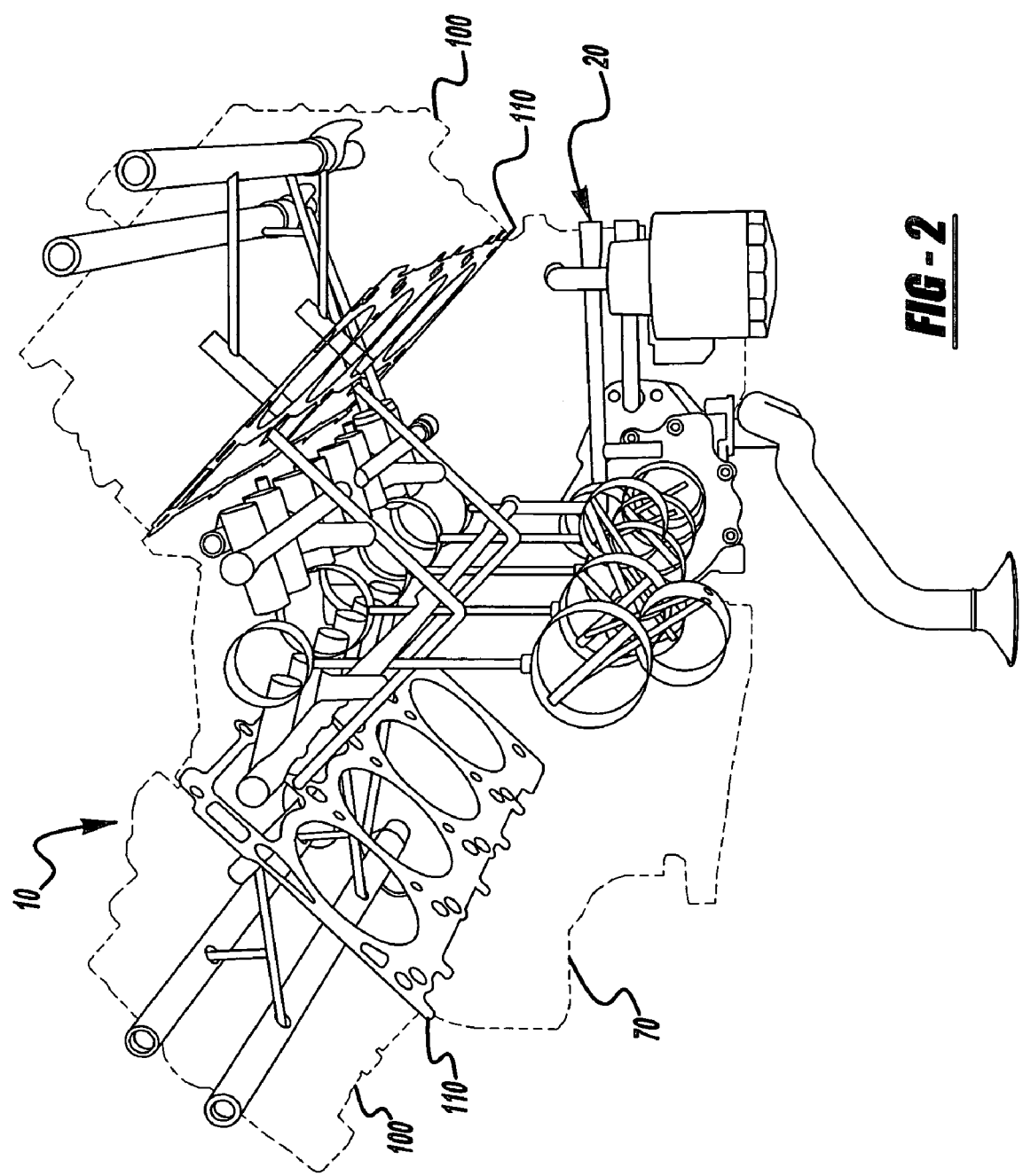
FIG. 2 illustrates the engine oiling circuit shown in FIG. 1 positioned in an internal combustion engine and interfacing with a cylinder head gasket in accordance with the present invention.

In the following description, several well-known features of an internal combustion engine are not shown or described so as not to obscure the present invention. Referring now to the drawings, FIGS. 1 and 2 illustrate an exemplary embodiment of an internal combustion engine 10 with an oiling circuit 20 that interfaces with a cylinder head gasket 110 including an integral filter element in accordance with the present invention. More specifically, FIG. 1 illustrates the engine oiling circuit 20 without corresponding engine structure and FIG. 2 illustrates engine oiling circuit 20 positioned in an internal combustion engine 10 and interfacing with cylinder head gasket 110.

As best seen in FIGS. 1 and 2, engine oiling circuit 20 provides a path for oil flow from an oil pump 30 through an oil filter 40 and into an oil feed passage referenced generally as 80. Oil then flows generally into a main oil gallery 60 located in cylinder block 70 through a plurality of the feed passages 80. Main oil gallery 60 is then used to further feed a plurality of other passages and components such as crankshaft oiling circuit 50. Most relevant to this invention are flow passages 90 that continue from feed passages 80 and serve as the feed passages to cylinder heads 100. Cylinder head feed passages 90 continue from feed passage 80 through the cylinder block 70 and interfaces with cylinder head gasket 110 before continuing through the cylinder head 100 as flow passages 120.

The cylinder head 100 in the exemplary embodiment utilizes a top down oiling arrangement where the oil feed passages continue through the cylinder head 100 via flow passage 120 and interface with rocker shafts 130. From the rocker shafts, oil travels through the respective rocker arms 150 and then through hollow push rods 170. From the push rods, the oil then travels into the lifter body 180 to provide hydraulic pressure to the lifters and then finally through conventional oil drain backs not shown.

Figure 3:
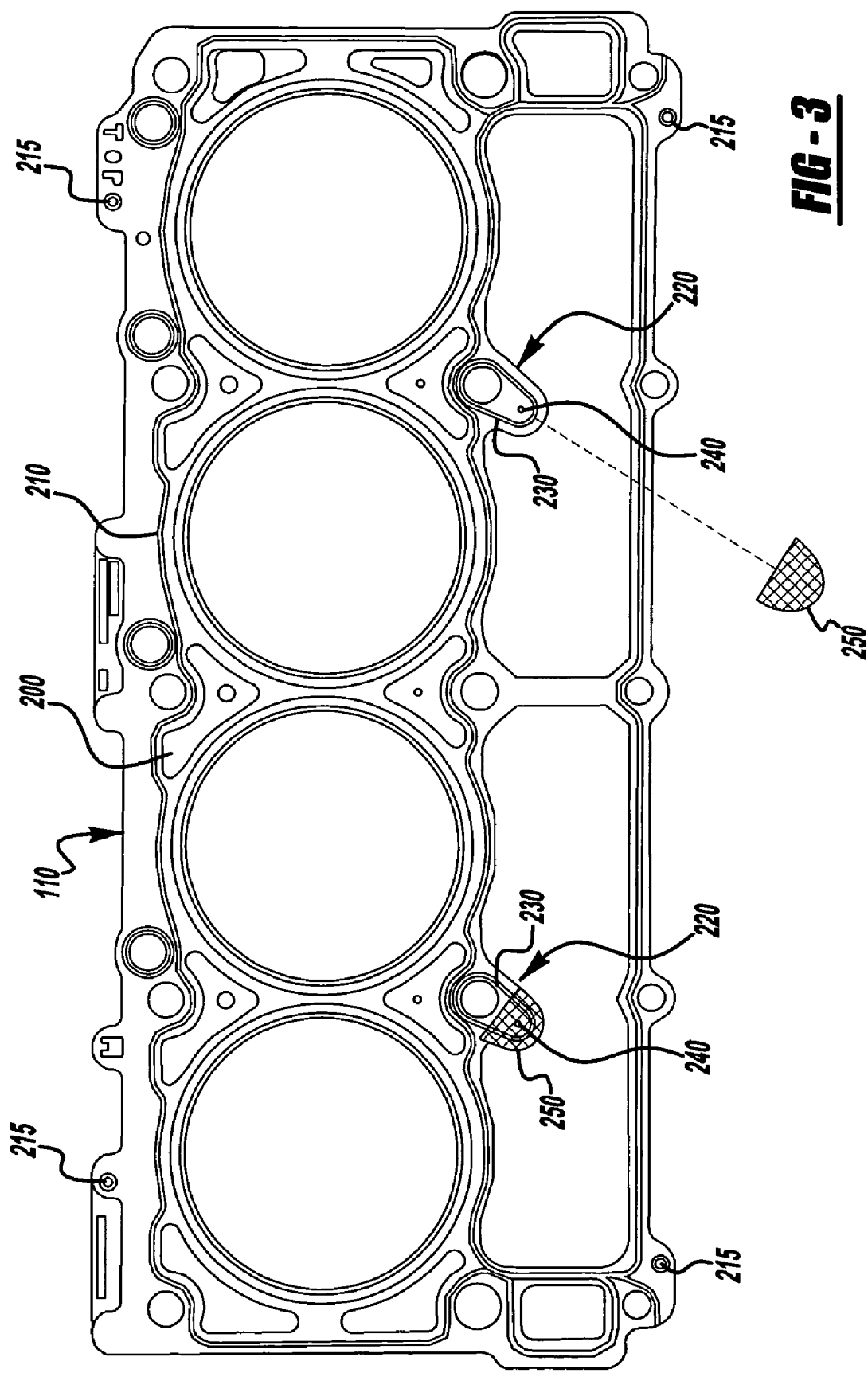
FIG. 3 illustrates a cylinder head gasket with a filter element in accordance with the present invention.

Referring now to FIG. 3, an exemplary embodiment of the cylinder head gasket 110 with integral filtering element 250 is shown in accordance with the present invention. In the preferred embodiment, gasket 110 is a conventional multi-layer-steel cylinder head gasket with three layers, a central layer 200 and two identical outer layers 210 positioned on each respective side of center layer 200. Outer layers 210 substantially cover center layer 200 and the layers are held together by rivets 215. Note, for illustration purposes, filter element 250 is shown positioned relative to only one of the two interface openings 230. In addition, it should be appreciated that a single-layer-steel gasket is within the purview of this invention.

Gasket 110 includes an interface area 220 including an interface opening 230 positioned to mate with oil flow passage 90 on the cylinder block 70 side of the gasket and flow passage 120 on the cylinder head side of the gasket. In addition, to balance and control oil pressure between the cylinder block 70 and the cylinder heads 100, an oil metering orifice 240 is positioned in the central layer so as to be inside a perimeter created by interface openings 230 in each of outer layers 210. Gasket 110 further includes a filter element 250 positioned relative to the interface opening 230 so as to provide a barrier to debris in oil that passes from the cylinder block 70 to the cylinder head 100. Filter element 250 can be formed using known filtering media, such as a screen or mesh element as shown in the exemplary embodiment. Filter element 250 is positioned on the gasket relative to interface opening 230, and can be attached/secured thereto by welding or with the use of an adhesive bonding material capable of withstanding cylinder head operating temperatures.

In the exemplary embodiment shown in FIG. 3, oil passage 90 and oil passage 120 do not align at a common axis at the gasket 100. Therefore, the interface opening 230 is designed to accommodate this misalignment and the filter element 250 is only required to be positioned over the feed passage 90 carrying oil and potential debris from the cylinder block 70 towards the cylinder head 100. However, it should be appreciated that many different oil flow passage and alignment configurations as well as corresponding filter media positioning on the gasket are within the purview of this invention. For example, it is envisioned that filter element 250 could be positioned over the entire interface opening as well as on one or both of outer gasket layers 210 or positioned relative to an opening in a different style of cylinder head gasket. Finally, depending on engine design characteristic, oil metering orifice 240 may or may not be required.

In operation, filter element 250 is designed to provide a barrier to debris traveling in the oil such that the debris does not travel into the cylinder head. In a conventional internal combustion engine, there is a potential for manufacturing debris to remain in the engine after the manufacturing process. Should any debris remain in the engine in a flow passage location in the cylinder block that is downstream of the oil filter, the gasket according to the present invention can stop such debris before it can travel into the cylinder head and potentially damage intricate componentry such as rocker arm oil passages, lifters, cam phasers and cylinder deactivation solenoids. The same is true for any debris formed during normal engine operation. Finally, most of today's engines operate in an oil filter bypass mode during cold ambient temperature start-up conditions. Under these circumstances, any debris in the oil is prevented from flowing into the cylinder head by the integrated gasket filtering element in accordance with the present invention.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A cylinder head gasket for an engine, the gasket comprising:

an opening positioned in a multi-layer-steel gasket having three layers and arranged to align with an engine oiling circuit passage to allow oil to pass from a cylinder block through the gasket to a cylinder head, the gasket opening including an oil metering orifice for balancing oil pressure between the cylinder block and the cylinder head, and wherein the gasket opening is positioned in an outer layer and the oil metering orifice is positioned in a center layer; and a filter element attached to the gasket relative to the gasket opening and arranged to provide a barrier to debris in the oiling circuit.

2. The cylinder head gasket of claim 1, wherein the filter element comprises a screen.

3. The cylinder head gasket of claim 1, wherein the filter element is attached to the gasket with an adhesive.

4. The cylinder head gasket of claim 1, wherein the filter element is welded to the cylinder head gasket.

* * * * *